Patented Mar. 5, 1935　　　　　　　　　　　　　　　1,993,433

UNITED STATES PATENT OFFICE 1,993,433

DIAZO PREPARATIONS AND PROCESS OF MAKING SAME

Gérald Bonhôte, Basel, Switzerland, assignor to the firm of Society of Chemical Industry in Basle, Basel, Switzerland No Drawing. Application June 16, 1934, Serial No. 730,996. In Switzerland September 27, 1933

1 Claim. (Cl. 260—11)

In application Serial No. 705,954 it has been pointed out that in the production of insoluble azo-dyestuffs on the fiber dyeings are in many cases also obtained which possess a surprisingly good fastness to washing and soda boiling by using a diazotized aromatic ortho-aminocarboxylic acid as diazotizing component.

It has now been found that the diazotized aromatic ortho-aminocarboxylic acids may be separated from their solutions by various precipitants, and yield valuable diazo preparations. This result could not be expected at all, since up to now nothing has been known about the separation of such diazo compounds. Moreover, the diazo compounds of other aromatic carboxylic acids, such as those from meta- or para-aminobenzoic acids, can only be separated with bad yields. As precipitants there come into consideration products having a salting out action, such as for example sodium chloride, or products yielding salts or complex salts with diazo compounds, such as aromatic sulfonic acids, aromatic sulfono-carboxylic acids, acylated aminosulfonic acids, zinc chloride, cadmium chloride, salts of the hydrofluoboric acid etc. The separated diazo compounds have very probably the characteristic formula

wherein R means an aromatic radical of the benzene or naphthalene series, wherein further the diazo-group and the carboxyl-group stand in ortho-position to each other, and wherein finally the anion may be that of the hydrochloric acid or the hydrobromic acid (if necessary in combination with a salt inclined to form complex salts, such as zinc chloride or that of an aromatic sulfonic acid, such as the anion of the naphthalene-1:5-disulfonic acid or the para-chlorobenzene sulfonic acid. They are characterized by their stability. They may be used as such, but they can also be mixed with the usual dyeing assistants, such as aluminium sulfate, sodium sulfate, sodium acetate, sodium bicarbonate, alkali salts of the aromatic sulfonic acids, and the like.

The following examples illustrate the invention, the parts being by weight unless otherwise stated:—

Example 1

194 parts of 1-amino-4-acetylamino-2-benzoic acid are diazotized by introducing into 1200 parts by volume of water, 300 parts of ice and 250 parts by volume of hydrochloric acid of 30 per cent. strength, followed by addition of 200 parts by volume of a 5-N sodium nitrite solution. 100 parts of common salt are then introduced into the diazo solution. The hydrochloride of the 1-diazo-4-acetylamino-2-benzoic acid of the probable formula

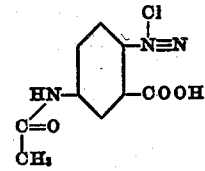

separates in the form of white crystals, giving a very good yield. The crystals are filtered off and dried at 30–40° C. in a vacuum. The product thus obtained is stable and very easily soluble in water.

Example 2

171.5 parts of 1-amino-4-chloro-2-benzoic acid are diazotized in the manner described in Example 1. The clear diazo solution is mixed with 300 parts of zinc chloride and common salt. The diazo compound containing zinc separates in the form of crystals giving an excellent yield.

Example 3

167 parts of 1-amino-5-methoxy-2-benzoic acid are diazotized as described in Example 1. The clear diazo solution is mixed with 300 parts of cadmium sulfate. The diazo compound separates immediately as cadmium double salt in the form of almost colorless crystals. The separation may be completed yet by the addition of some sodium chloride. The yield is very good.

Example 4

181 parts of 1-amino-5-ethoxy-2-benzoic acid are diazotized as described in Example 1. Into the diazo solution there are now introduced 250 parts of sodium para-chlorobenzene sulfonate and 200 parts of common salt. The stabilized diazo compound crystallizes in the form of colorless crystals giving a very good yield.

Example 5

151 parts of 1-amino-5-methyl-2-benzoic acid are diazotized as described in Example 1. The diazo compound crystallizes by addition of 200 parts of sodium 1:5-naphthalenedisulfonate to the clear diazo solution, giving a very good yield.

*Example 6*

182 parts of 1-amino-5-nitro-2-benzoic acid are dissolved in 2000 parts by volume of hot water, mixed with 250 parts by volume of hydrochloric acid of 30 per cent. strength, cooled to 5° C., and diazotized after addition of 200 parts by volume of a 5-N sodium nitrite solution. The stabilized diazo compound separates by addition of 200 parts of sodium α-naphthalene sulfonate in the form of yellow-brown crystals.

*Example 7*

187 parts of 2-amino-3-naphthoic acid are diazotized in the usual manner in 2000 parts by volume of water, and the zinc diazonium compound is separated by addition of 200 parts of zinc chloride and some common salt. The yield is very good.

What I claim is:—

The zinc chloride double salts of diazo compounds of the general formula

wherein R means an aromatic radical of the benzene or naphthalene series, and wherein the diazo-group and the carboxyl-group stand in ortho-position to each other, which products are soluble in water, and in solution behave like the free diazo compounds.

GÉRALD BONHÔTE.